US007965286B2

(12) United States Patent
Ryu et al.

(10) Patent No.: US 7,965,286 B2
(45) Date of Patent: Jun. 21, 2011

(54) TIMING CONTROLLER TO REDUCE FLICKER AND METHOD OF OPERATING DISPLAY DEVICE INCLUDING THE SAME

(75) Inventors: Keun-Ho Ryu, Yongin-si (KR); Young Min Choi, Seoul (KR); Jong Seon Kim, Seongnam-si (KR); Jae Chul Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 941 days.

(21) Appl. No.: 11/832,820

(22) Filed: Aug. 2, 2007

(65) Prior Publication Data

US 2008/0204444 A1 Aug. 28, 2008

(30) Foreign Application Priority Data

Feb. 26, 2007 (KR) ........................ 10-2007-0018998

(51) Int. Cl.
*G06F 3/038* (2006.01)
*G09G 5/00* (2006.01)

(52) U.S. Cl. ........................................................ 345/209

(58) Field of Classification Search ............ 345/24–205, 345/694, 209–215
See application file for complete search history.

(56) References Cited

U.S. PATENT DOCUMENTS

2002/0130830 A1* 9/2002 Park ................................ 345/99
2005/0001829 A1* 1/2005 Bu et al. ........................ 345/209

FOREIGN PATENT DOCUMENTS

| | | |
|---|---|---|
| JP | 2003-216124 | 7/2003 |
| JP | 2006-284825 | 10/2006 |
| KR | 2001-80830 | 8/2001 |
| KR | 2003-58140 | 7/2003 |
| KR | 2006-71573 | 6/2006 |

OTHER PUBLICATIONS

Korean Office Action dated Dec. 17, 2007 issued in KR 2007-18998.

* cited by examiner

*Primary Examiner* — Alexander S Beck
*Assistant Examiner* — Kenneth Bukowski
(74) *Attorney, Agent, or Firm* — Stanzione & Kim, LLP

(57) ABSTRACT

A timing controller to reduce a flicker in a display device is provided. The timing controller includes a line pattern detector and a frame pattern detector. The line pattern detector divides received data into a plurality of unit blocks and detects a line polarity of each of a plurality of horizontal lines included in each of the unit blocks. The frame pattern detector generates a polarity control signal to control a data inversion method based on a frame image pattern detected based on line polarities of the respective horizontal lines.

21 Claims, 10 Drawing Sheets

TIMING CONTROLLER TO REDUCE FLICKER AND METHOD OF OPERATING DISPLAY DEVICE INCLUDING THE SAME

CROSS-REFERENCE TO RELATED APPLICATIONS

This application claims priority under 35 U.S.C. §119 from Korean Patent Application No. 2007-0018998, filed on Feb. 26, 2007, the disclosure of which is hereby incorporated by reference in its entirety.

BACKGROUND OF THE INVENTION

1. Field of the Invention

The present general inventive concept relates to a timing controller, and more particularly, to a timing controller to change a data inversion method based on an image pattern of data in a display device.

2. Description of the Related Art

When a representative flat panel display device such as a thin film transistor liquid crystal display (TFT-LCD) panel, is driven, an alternating current (AC) driving method is used in order to prevent the degradation of the panel.

FIG. 1 illustrates a unit pixel in a conventional TFT-LCD panel. Referring to FIG. 1, the unit pixel includes a transistor Tr, a liquid crystal capacitor Clc, a storage capacitor Cst, and a parasitic capacitor Cgd between a drain and a gate of the transistor Tr.

In the AC driving method, a common voltage VCOM needs to be maintained constant in order to represent the same grayscale value. However, an offset component occurs in the common voltage VCOM due to the parasitic capacitor Cgd. This phenomenon is referred to as a kick-back effect. A flicker occurs due to the offset component in the common voltage VCOM. At this time, if an image pattern which is the same as that in a data inversion method in the display device is input, the kick-back effect is increased, and therefore, the flicker becomes worse.

FIG. 2 illustrates waveforms of a plurality of signals used to drive the unit pixel illustrated in FIG. 1. A procedure in which a flicker occurs due to an offset component Voffset in the common voltage VCOM will be described with reference to FIGS. 1 and 2.

A gate voltage VG is applied to turn on the transistor Tr and a drain voltage VD is a drain voltage of the transistor Tr. It is ideal that the common voltage VCOM maintains constant, but the offset component Voffset occurs due to the kick-back effect caused by the parasitic capacitor Cgd.

The voltage that is applied to both ends of the liquid crystal capacitor Clc in order to drive the unit pixel must be a voltage between the drain voltage VD and the common voltage VCOM' having the offset component Voffset. Referring to FIG. 2, a driving voltage for an odd frame and a driving voltage for an even frame are asymmetric with respect to the common voltage VCOM not having the offset component Voffset. Accordingly, a voltage applied to both ends of the liquid crystal capacitor Clc with respect to the odd frame is different from that with respect to the even frame. As a result, the brightness of the unit pixel is different, causing a flicker.

At present, panel manufacturers produce panels for which an offset voltage of a common voltage has been compensated for using variable resistance. However, since the offset voltage of the common voltage changes according to a type of panel and the position of a pixel, it is difficult to accomplish exact compensation.

SUMMARY OF THE INVENTION

An embodiment of the present general inventive concept provides a timing controller of a display device, to reduce a flicker by detecting a displayed image pattern and changing a data inversion method of the display device when there are a lot of image patterns that coincide with a data driving method of the display device.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a timing controller including a line pattern detector and a frame pattern detector. The line pattern detector divides received data into a plurality of unit blocks and detects a line polarity of each of a plurality of horizontal lines included in each of the unit blocks. The frame pattern detector generates a polarity control signal to control a data inversion method based on a frame image pattern detected based on line polarities of the respective horizontal lines.

The line pattern detector may include a first adder and a line polarity detection block. The first adder adds grayscale values of odd subpixels on each of the plurality of horizontal lines so as to obtain a first sum and adds grayscale values of even subpixels on each of the plurality of horizontal lines so as to obtain a second sum. The line polarity detection block detects the line polarity of each of the plurality of horizontal lines based on the first sum and the second sum.

The line polarity detection block may include a subtractor and a line polarity detector. The subtractor receives the first sum and the second sum and outputs a difference between the first sum and the second sum. The line polarity detector detects the line polarity of each of the plurality of horizontal lines based on the difference between the first sum and the second sum.

The line polarity detector may detect the polarity of each of the horizontal lines only when the difference between the first sum and the second sum is greater than a predetermined threshold value. Also, the line polarity detector may change a method of detecting the line polarity based on a data inversion method of a display device.

The line pattern detector may further include a line polarity register to store a result of detecting the line polarity.

The frame pattern detector may include a frame image detection block and an inversion method controller. The frame image detection block determines the frame image pattern based on a result of line polarity detection. The inversion method controller may generate the polarity control signal to control the data inversion method based on the frame image pattern.

The frame image detection block may include a block image detector, a second adder, and a frame image detector. The block image detector detects an image pattern of each of the unit blocks based on the result of the line polarity detection. The second adder counts image patterns coinciding with a first data inversion method among image patterns of the respective unit blocks so as to obtain a third sum and counts image patterns coinciding with a second data inversion method among the image patterns of the respective unit blocks so as to obtain a fourth sum. The frame image detector compares the third sum with the fourth sum and determines the frame image pattern.

The foregoing and/or other aspects and utilities of the present general inventive concept may also be achieved by providing a display device including a panel, a source driver, and a timing controller. The panel includes a plurality of source lines. The source driver outputs data to drive the plurality of source lines. The timing controller generates a polarity control signal to control a data inversion method with respect to the data.

The foregoing and/or other aspects and utilities of the present general inventive concept may also be achieved by providing a method of operating a display device includes detecting a line polarity of each of a plurality of horizontal lines included in each of a plurality of unit blocks into which received data is divided, and generating a polarity control signal to control a data inversion method based on a frame image pattern detected based on line polarities of the respective horizontal lines.

The detecting of the line polarity of each of the plurality of horizontal lines may include obtaining a first sum and a second sum by adding grayscale values of odd subpixels on each of the plurality of horizontal lines and adding grayscale values of even subpixels on each horizontal line, and detecting the line polarity of each horizontal line based on the first sum and the second sum.

The detecting of the line polarity of each horizontal line based on the first sum and the second sum may include obtaining a difference between the first sum and the second sum, and detecting the line polarity of each horizontal line based on the difference between the first sum and the second sum.

The detecting of the line polarity of each horizontal line based on the difference may be performed only when the difference between the first sum and the second sum is greater than a predetermined threshold value. The detecting the line polarity of each horizontal line based on the difference may include changing a method of detecting the line polarity based on a data inversion method of a display device.

The detecting of the line polarity of each of the plurality of horizontal lines may further include storing a result of detecting the line polarity.

The generating of the polarity control signal may include determining the frame image pattern based on a result of detecting the line polarity, and generating the polarity control signal to control the data inversion method based on the frame image pattern.

The determining the frame image pattern may include detecting an image pattern of each of the unit blocks based on the result of detecting the line polarity, obtaining a third sum and a fourth sum by counting image patterns coinciding with a first data inversion method among image patterns of the respective unit blocks and counting image patterns coinciding with a second data inversion method among the image patterns of the respective unit blocks, and comparing the third sum with the fourth sum and determining the frame image pattern.

The foregoing and/or other aspects and utilities of the present general inventive concept may also be achieved by providing a timing controller, including a detector to detect an image pattern of data and a controller to change a data inversion process based on the detected image pattern.

The foregoing and/or other aspects and utilities of the present general inventive concept may also be achieved by providing a display apparatus, including a panel including a plurality of source lines, a source driver to output data to drive the plurality of source lines, and a timing controller including a detector to detect an image pattern of data and a controller to change a data inversion process based on the detected image pattern.

The foregoing and/or other aspects and utilities of the present general inventive concept may also be achieved by providing a method to reduce flickering in a display unit, the method including detecting an image pattern of data corresponding to a display unit and changing a data inversion process based on the detected image pattern.

The foregoing and/or other aspects and utilities of the present general inventive concept may also be achieved by providing a computer-readable recording medium having embodied thereon a computer program to execute a method, wherein the method includes detecting an image pattern of data corresponding to a display unit and changing a data inversion process based on the detected image pattern.

BRIEF DESCRIPTION OF THE DRAWINGS

The above and other aspects and utilities of the present general inventive concept will become more apparent by describing in detail exemplary embodiments thereof with reference to the attached drawings in which.

DETAILED DESCRIPTION OF THE PREFERRED EMBODIMENTS

Figure 1:
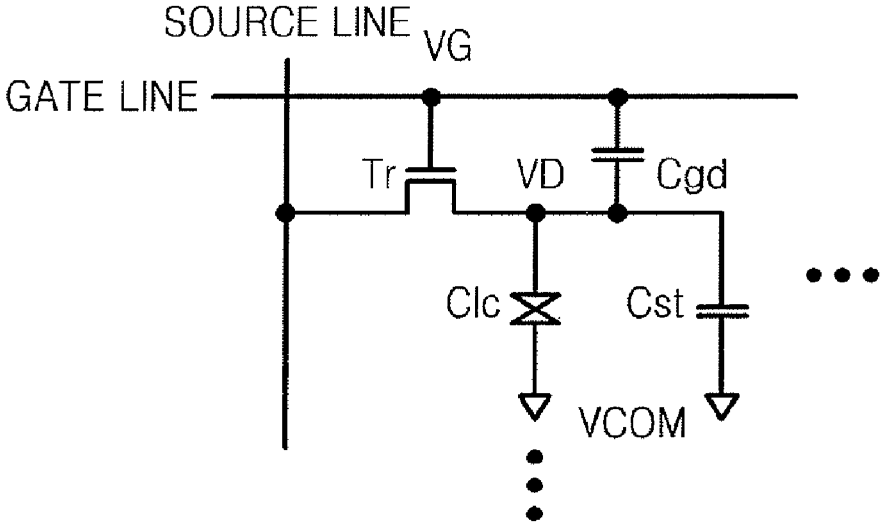
FIG. 1(CONVENTIONAL ART)
FIG. 1 illustrates a unit pixel in a conventional panel.
Figure 2:
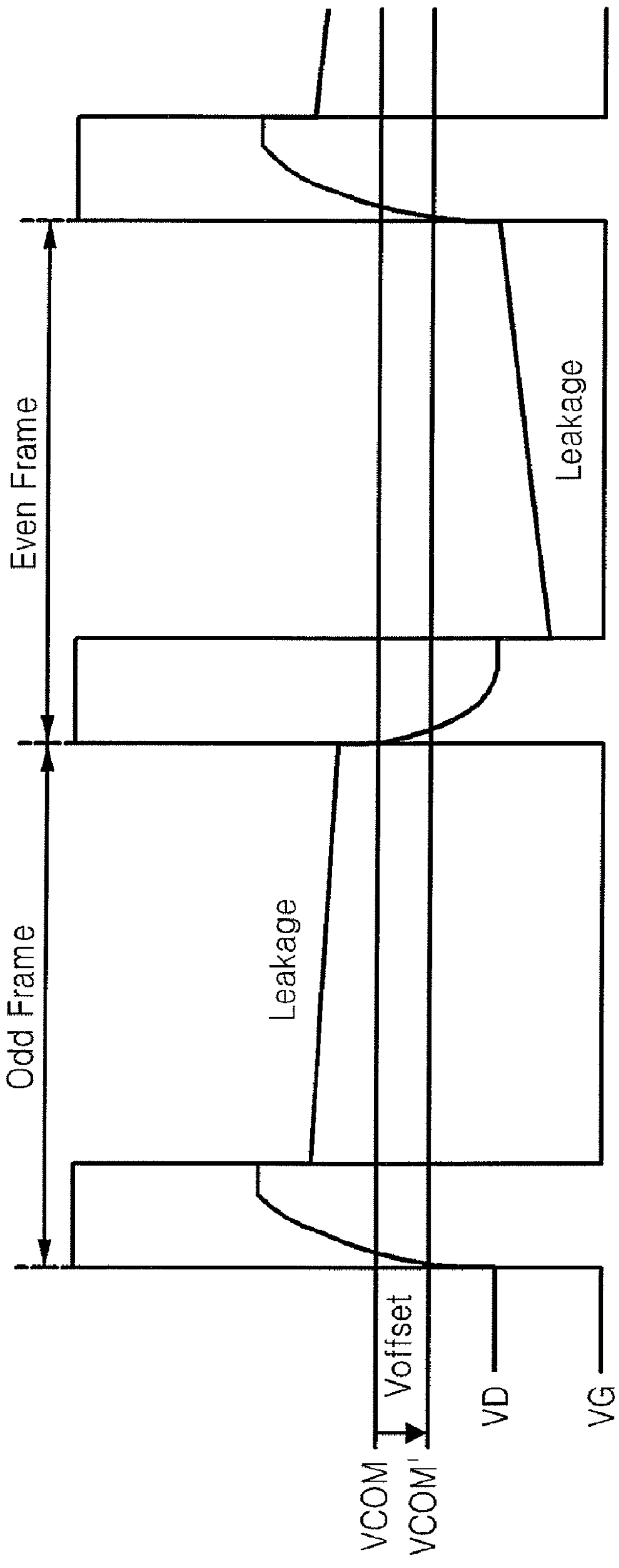
FIG. 2(CONVENTIONAL ART)
FIG. 2 illustrates waveforms of a plurality of signals used to drive the unit pixel illustrated in FIG. 1.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the present general inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this present general inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 3:
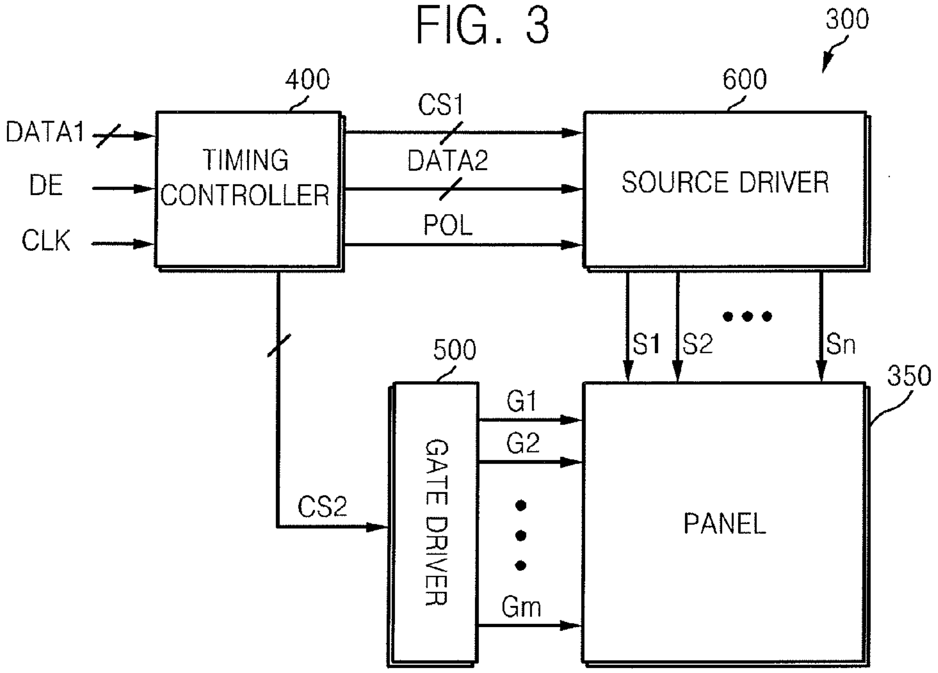
FIG. 3 is a block diagram illustrating a display device according to an embodiment of the present general inventive concept.

FIG. 3 is a block diagram illustrating a display device 300 according to an embodiment of the present general inventive concept. The display device 300 includes a panel 350, a timing controller 400, a gate driver 500, and a source driver 600.

The panel 350 includes a plurality of gate lines G1 through Gm (where m is a natural number), a plurality of source lines S1 through Sn (where n is a natural number, for example, n=m, or n≠m), and a plurality of pixels (not illustrated). Each of the pixels is connected with a corresponding gate line among the gate lines G1 through Gm and a corresponding source line among the source lines S1 through Sn. The timing controller 400 generates a first control signal CS1, a second control signal CS2, data DATA2, and a polarity control signal POL based on data DATA1, a data enable signal DE, and a clock signal CLK.

The gate driver 500 drives the gate lines G1 through Gm in response to the second control signal CS2 and the source driver 600 outputs an analog voltage to the source lines S1 through Sn in response to the first control signal CS1, the data DATA2, and the polarity control signal POL. The analog voltage is inverted on a basis of a common voltage of the panel 350 in response to the polarity control signal POL.

Figure 4:
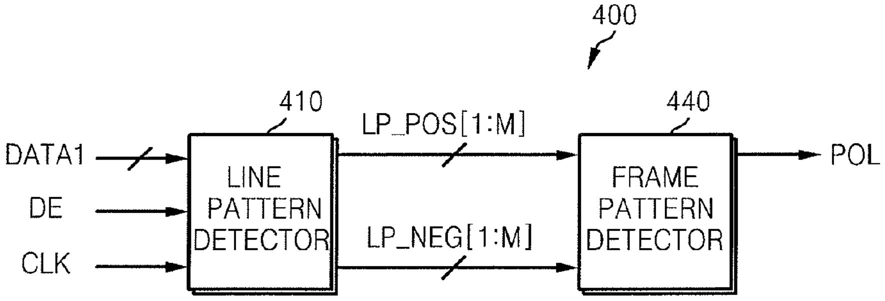
FIG. 4 is a block diagram illustrating a timing controller according to an embodiment of the present general inventive concept.

FIG. 4 is a block diagram illustrating the timing controller 400 according to an embodiment of the present general inventive concept. Referring to FIG. 4, the timing controller 400 includes a line pattern detector 410 and a frame pattern detector 440. The line pattern detector 410 detects a line polarity using a data input method of the timing controller 400 and stores only a detection result in a register. Accordingly, the line pattern detector 410 does not need a special memory other than the register.

The line pattern detector 410 divides the data DATA1 into a plurality of unit blocks and detects a line polarity LP_POS[1:M] or LP_NEG[1:M] of each of a plurality of horizontal lines included in each of the unit blocks, where M is a natural number. For instance, the line pattern detector 410 may define 8 pixels in a horizontal direction and 8 horizontal lines in a vertical direction as a single unit block, which may be a minimum unit in which a flicker visible to naked eyes occurs when a supper extended graphic array (SXGA)-class panel is driven.

In usual SXGA-class panels, a flicker visible to naked eyes occurs only when all of 8 horizontal lines have a first polarity (e.g., one of a positive polarity and a negative polarity) or a second polarity (e.g., the other one of the positive polarity and the negative polarity). The size of the unit block and the number of flicker-causing lines having the same polarity may vary with a type of panel, a data inversion method, resolution, etc.

The frame pattern detector 440 generates the polarity control signal POL to control the data inversion method based on an image pattern of an entire frame, which is detected based on the line polarity LP_POS[1:M] or LP_NEG[1:M] of each horizontal line.

Figure 5:
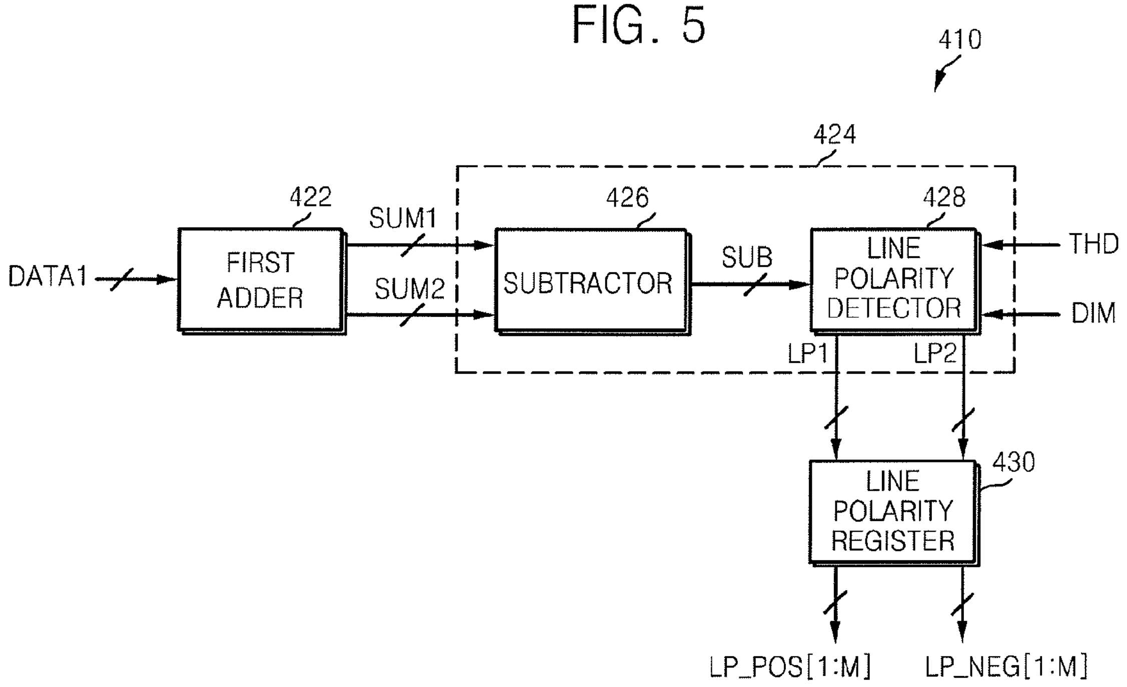
FIG. 5 is a block diagram illustrating a line pattern detector illustrated in FIG. 4.

FIG. 5 is a block diagram of the line pattern detector 410 illustrated in FIG. 4. Referring to FIG. 5, the line pattern detector 410 includes a first adder 422 and a line polarity detection block 424. The first adder 422 adds grayscale values of odd subpixels in each of the horizontal lines so as to output a first sum SUM1 and adds grayscale values of even subpixels in each horizontal line so as to output a second sum SUM2. A grayscale value is obtained by dividing a voltage applied to drive the subpixels into a plurality of units based on a number of bits in the data DATA1. For instance, when the data DATA1 has 8 bits, the grayscale value may be 0 to 255.

The polarity detection block 424 detects the line polarity of each horizontal line based on the first sum SUM1 and the second sum SUM2. The polarity detection block 424 includes a subtractor 426 and a line polarity detector 428.

The subtractor 426 receives the first sum SUM1 and the second sum SUM2 and outputs a difference (hereinafter, referred to as a "summation difference") SUB between the first sum SUM1 and the second sum SUM2. The line polarity detector 428 detects whether each horizontal line has a first polarity (e.g., positive polarity) LP1 or a second polarity (e.g., negative polarity) LP2 based on the summation difference SUB.

The line polarity detector 428 can detect the line polarity of each horizontal line only when the summation difference SUB is greater than a predetermined threshold value THD. The threshold value THD indicates the summation difference SUB at which a flicker visible to naked eyes starts occurring when the panel 350 is driven using an alternating current (AC) driving method. In addition, the line polarity detector 428 can change a line polarity detection method based on a data inversion method (DIM) of the display device 300.

The line pattern detector 410 may further include a line polarity register 430 which stores the line polarity detection results LP1 and LP2. The line polarity register 430 outputs the stored line polarity LP_POS[1:M] or LP_NEG[1:M] of each horizontal line.

Figure 6A:
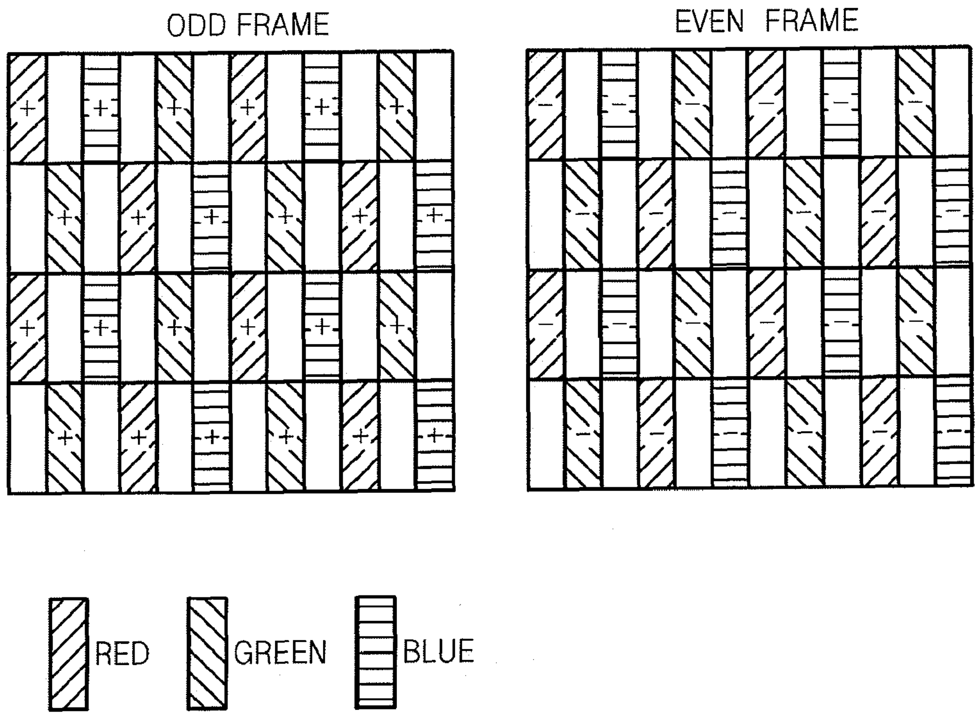
FIG. 6A illustrates an image pattern in a 1-line 1-subpixel inversion method.
Figure 6B:
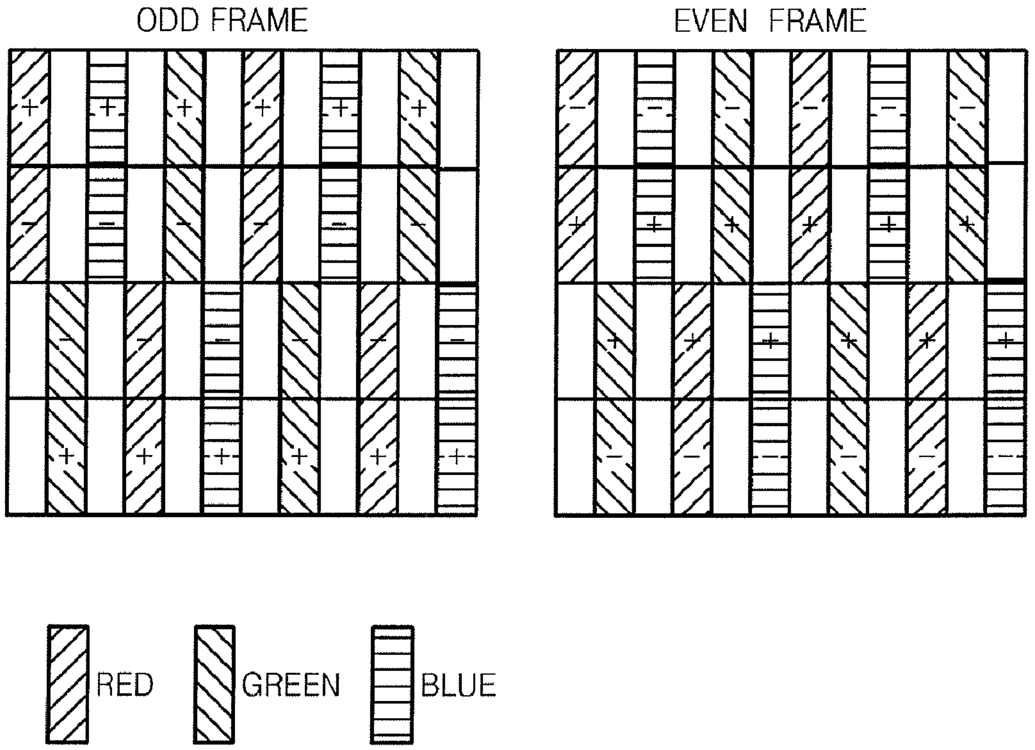
FIG. 6B illustrates an image pattern in a 2-line 1-subpixel inversion method.

FIG. 6A illustrates an image pattern in a 1-line 1-subpixel inversion method (hereinafter, referred to as a "1-dot inversion method"). FIG. 6B illustrates an image pattern in a 2-line 1-subpixel inversion method (hereinafter, referred to as a "2-dot inversion method"). The image patterns are used to test the occurrence of a flicker.

A subpixel may be a red subpixel, a green subpixel, or a blue subpixel. In FIGS. 6A and 6B, subpixels marked with a negative (−) or positive (+) polarity sign are being driven while subpixels with no marks are not being driven. When an odd frame and an even frame alternate with each other, the polarity of each subpixel is inverted, but the grayscale value of the subpixel is constant.

Figure 7:
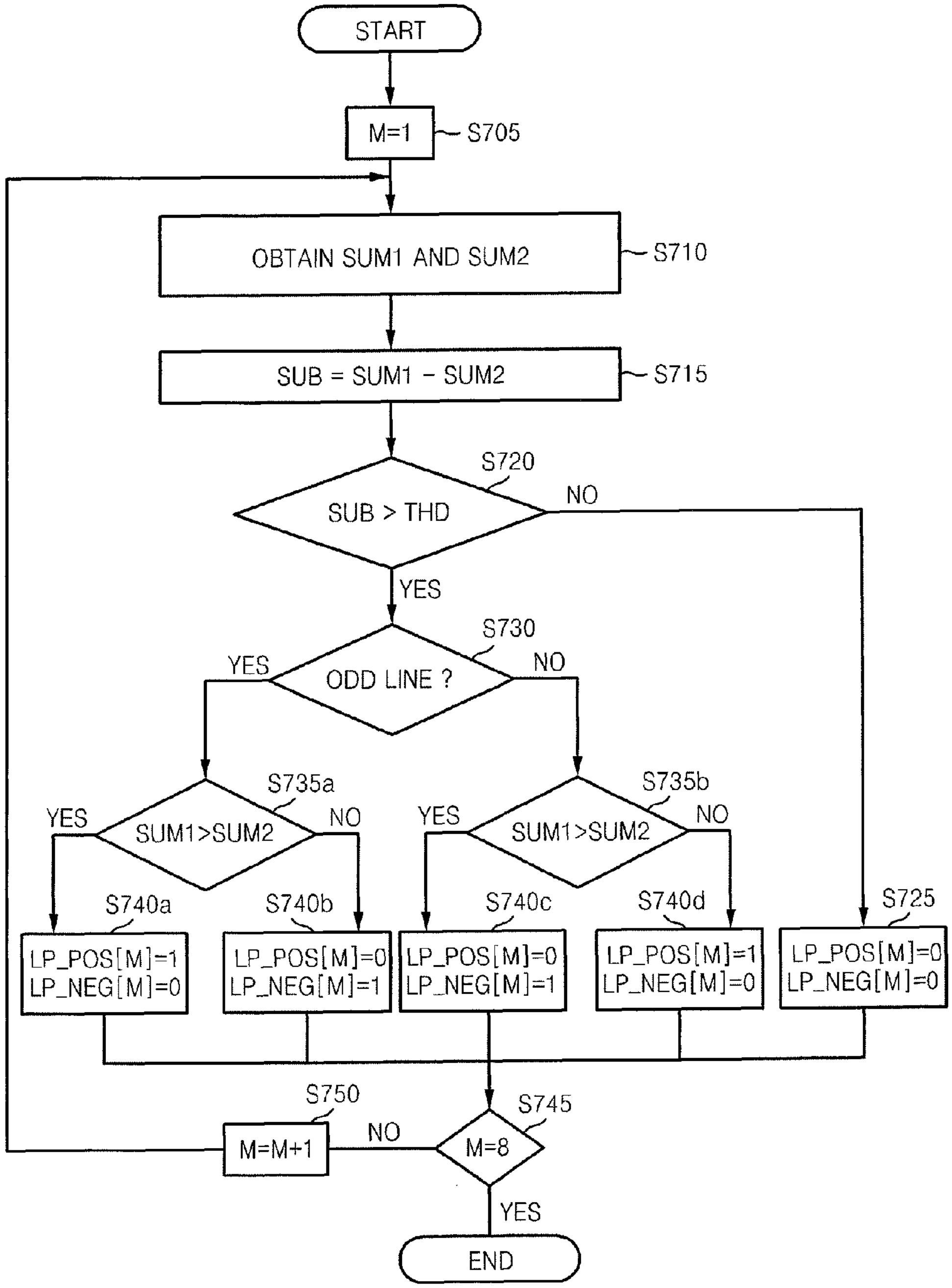
FIG. 7 is a flowchart illustrating an operation of the line pattern detector, according to an embodiment of the present general inventive concept.
Figure 8:
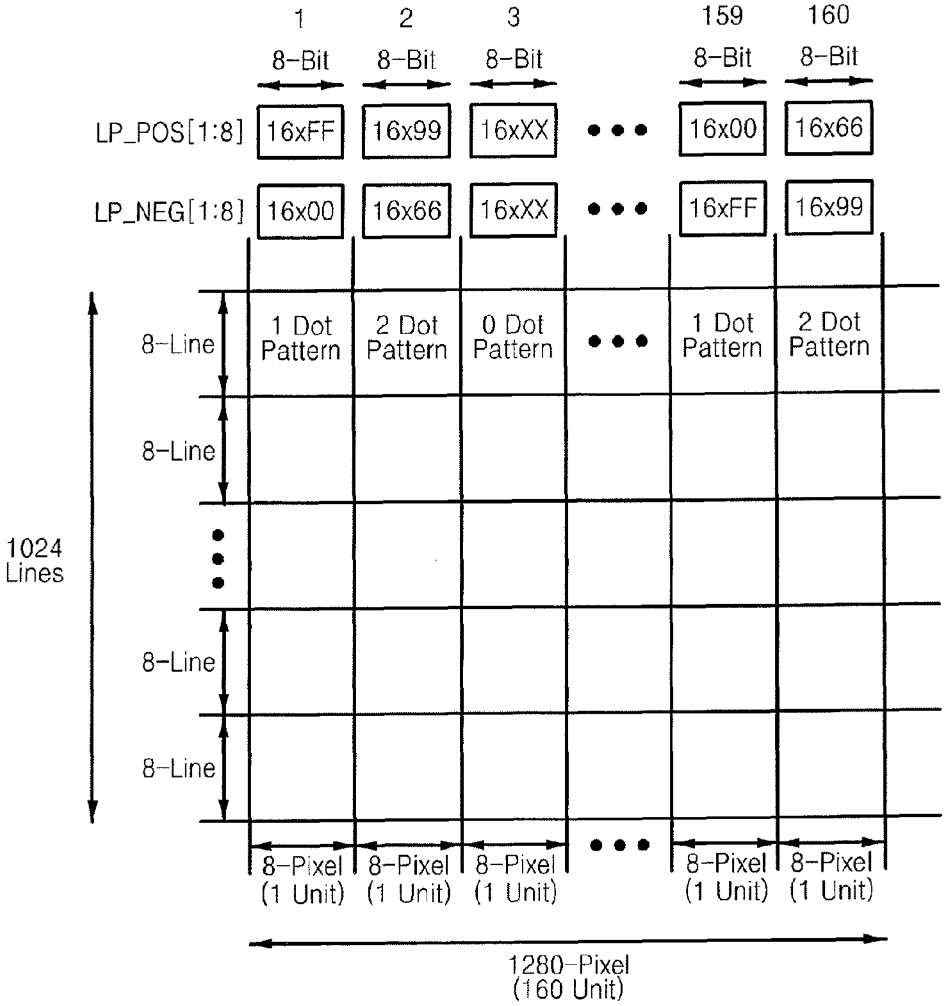
FIG. 8 illustrates data stored in a line polarity register of the line pattern detector included in the display device, according to an embodiment of the present general inventive concept.

FIG. 7 is a flowchart illustrating an operation of the line pattern detector 410, according to an embodiment of the present general inventive concept. FIG. 8 illustrates data stored in the line polarity register 430 of the line pattern detector 410, according to an embodiment of the present general inventive concept. Hereinafter, the operation of the line pattern detector 410 in a display device that operates using the 1-dot inversion method will be described with reference to FIGS. 4 through 8. The operation of the line pattern detector 410 with respect to the image pattern in the 1-dot inversion method and the operation of the line pattern detector 410 with respect to the image pattern in the 2-dot inversion method are the same in units of 4 horizontal lines. A result of the operation of the line pattern detector 410 with respect to 8 horizontal lines is the same as two repetitions of a result of the line pattern detector 410 with respect to 4 horizontal lines. Accordingly, the operation of the line pattern detector 410 with respect to 4 horizontal lines only will be described below.

In operation S705, the line pattern detector 410 selects a first horizontal line in a unit block to detect a line polarity of each horizontal line starting from the first horizontal line. In operation S710, the first adder 422 of the line pattern detector 410 adds grayscale values of odd subpixels on the selected horizontal line, adds grayscale values of even subpixels on the horizontal line, and outputs the first sum SUM1 and the second sum SUM2.

In the odd frame in FIG. 6A illustrating the image pattern of the 1-dot inversion method, since only odd subpixels on each odd horizontal line operate, the first sum SUM1 is the sum of the grayscales of the odd subpixels and the second sum SUM2 is 0. It is assumed that subpixels that are being driven have the same grayscale value and the sum of grayscale values of the subpixels that are being driven on each horizontal line does access the threshold value THD. Alternatively, since only even subpixels on each even horizontal line operate, the first sum SUM1 is 0 and the second sum SUM2 is the sum of the grayscales of the even subpixels. In the even frame, the polarity of each subpixel is inverted, but the first sum SUM1 and the second sum SUM2 do not change.

In the odd frame in FIG. 6B illustrating the image pattern of the 2-dot inversion method, since only odd subpixels on first and second horizontal lines operate, the first sum SUM1 is the sum of the grayscales of the odd subpixels and the second sum SUM2 is 0. Since only even subpixels on third and fourth horizontal lines operate, the first sum SUM1 is 0 and the second sum SUM2 is the sum of the grayscales of the even subpixels. As in the image pattern of the 1-dot inversion method illustrated in FIG. 6A, the polarity of each subpixel is inverted in the even frame, but the first sum SUM1 and the second sum SUM2 do not change.

In operation S715, the subtractor 426 of the line pattern detector 410 receives the first sum SUM1 and the second sum SUM2 and outputs the summation difference SUB between the first sum SUM1 and the second sum SUM2. The summation difference SUB has an absolute value.

In operation S720, the line pattern detector 410 determines whether the summation difference SUB exceeds the threshold value THD. When it is determined that the summation difference SUB does not exceed the threshold value THD, the line pattern detector 410 does not detect the line polarity of the current horizontal line. Then, in operation S725 a second logic value (e.g., a logic value "0") is stored in a positive polarity register (hereinafter, referred to as a first line polarity register) LP_POS and a negative polarity register (hereinafter, referred to as a second line polarity register) LP_NEG which are included in the line polarity register 430.

When it is determined that the summation difference SUB exceeds the threshold value THD, the line pattern detector 410 detects the line polarity of the horizontal line. The line polarity detector 428 of the line pattern detector 410 determines whether the horizontal line is an odd line in operation S730 and compares the first sum SUM1 of the horizontal line with the second sum SUM2 thereof to detect the polarity of the horizontal line in operations S735*a* and S735*b*. The line polarity register 430 stores the detected polarity in operations S740*a* through S740*d*.

A result of the operation of the line pattern detector 410 with respect to an even frame is opposite to a result of the operation of the line pattern detector 410 with respect to an odd frame. Accordingly, the operation of the line pattern detector 410 with respect to the odd frame only will be described.

When it is determined that the horizontal line is an odd line in the image pattern of the 1-dot inversion method in operation S730, the first sum SUM1 is always greater than the second sum SUM2, and therefore, the line polarity detector 428 detects the horizontal line as having the first polarity LP1 (e.g., a positive polarity) in operation S735*a*. In operation S740*a*, a first logic value (e.g., a logic value "1") is stored in the first line polarity register LP_POS and a second logic value (e.g., a logic value "0") is stored in the second line polarity register LP_NEG.

When it is determined that the horizontal line is an even line in the image pattern of the 1-dot inversion method in operation S730, the first sum SUM1 is always less than the second sum SUM2. However, the polarity is opposite to that regarding the odd line, and therefore, the line polarity detector 428 detects the horizontal line as having the first polarity LP1 (the positive polarity) in operation S735*b*. In operation S740*d*, the first logic value (the logic value "1") is stored in the first line polarity register LP_POS and the second logic value (the logic value "0") is stored in the second line polarity register LP_NEG.

The line pattern detector 410 determines whether polarities of all of 8 horizontal lines have been detected in operation S745. When it is determined that the polarities of all 8 horizontal lines have not been detected yet, the line pattern detector 410 performs line polarity detection on the next horizontal line through operation S750.

As a result, when the line polarity detection is completed with respect to a unit block having the image pattern of the 1-dot inversion method, binary digits "1111 1111" are stored in the first line polarity register LP_POS and binary digits "0000 0000" are stored in the second line polarity register LP_NEG.

When it is determined that the horizontal line is the first line in the image pattern of the 2-dot inversion method in operation S730, the first sum SUM1 is always greater than the second sum SUM2, and therefore, the line polarity detector 428 detects the current horizontal line as having the first polarity LP1 (the positive polarity) in operation S735*a*. However, when it is determined that the horizontal line is the third line in the image pattern of the 2-dot inversion method in operation S730, the first sum SUM1 is always less than the second sum SUM2, and therefore, the line polarity detector 428 detects the current horizontal line as having the second polarity LP2 (the negative polarity) in operation S735*a*.

When it is determined that the horizontal line is the second line in the image pattern of the 2-dot inversion method in operation S730, the first sum SUM1 is always greater than the second sum SUM2. However, the polarity is opposite to that regarding the first line, and therefore, the line polarity detector 428 detects the horizontal line as having the second polarity LP2 (the negative polarity) in operation S7355*b*. When it is determined that the horizontal line is the fourth line in the image pattern of the 2-dot inversion method in operation S730, the first sum SUM1 is always less than the second sum SUM2. However, the polarity is opposite to that regarding the third line, and therefore, the line polarity detector 428 detects the fourth horizontal line as having the first polarity LP1 (the positive polarity) in operation S735*b*.

As a result, when the line polarity detection is completed with respect to a unit block having the image pattern of the 2-dot inversion method, binary digits "1001 1001" are stored in the first line polarity register LP_POS and binary digits "0110 0110" are stored in the second line polarity register LP_NEG.

Referring to FIG. 8, an SXGA-class panel corresponds to 1280 pixels in a row that are classified into 160 units and a pair of line polarity registers LP_POS and LP_NEG are needed for each unit. Accordingly, the line pattern detector 410 for the SXGA-class panel includes 320 line polarity registers 430. 1024 horizontal lines share the line polarity registers 430 one another. Accordingly, when line polarity detection is completed with respect to 8 horizontal lines, the line polarity registers 430 are also used to detect line polarities of the next 8 horizontal lines. Accordingly, the line pattern detector 410 can increase memory use efficiency.

With respect to the image pattern of an odd frame in the 1-dot inversion method, binary digits "1111 1111", i.e., hexadecimal digits "FF" are stored in the first line polarity register LP_POS and binary digits "0000 0000", i.e., hexadecimal digits "00" are stored in the second line polarity register LP_NEG. This will be reversed with respect to an even frame.

With respect to the image pattern of an odd frame in the 2-dot inversion method, binary digits "1001 1001", i.e., hexadecimal digits "99" are stored in the first line polarity register LP_POS and binary digits "0110 0110", i.e., hexadecimal digits "66" are stored in the second line polarity register LP_NEG. This will be reversed with respect to an even frame.

In FIG. 8, a unit block marked with a "0-dot pattern" has an image pattern other than the image pattern of the 1-dot inversion method and the image pattern of the 2-dot inversion method and is irrelevant to a data inversion method.

Figure 9:
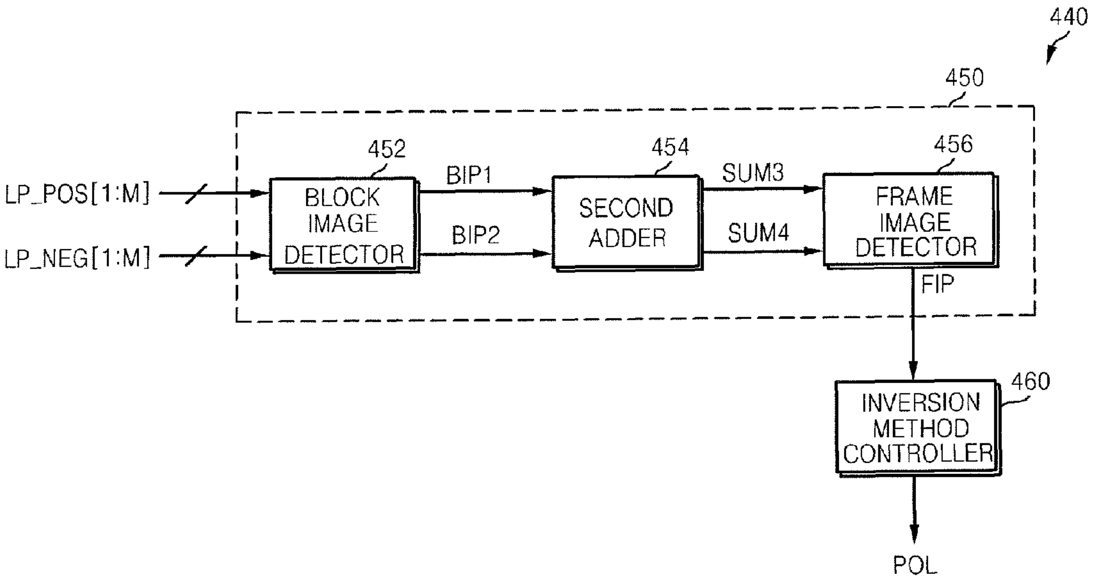
FIG. 9 is a block diagram illustrating a frame pattern detector illustrated in FIG. 4.

FIG. 9 is a block diagram illustrating the frame pattern detector 440 illustrated in FIG. 4. Referring to FIG. 9, the frame pattern detector 440 includes a frame image detection block 450 and an inversion method controller 460. The frame image detection block 450 determines a frame image pattern FIP of an entire frame based on the line polarity detection results LP_POS[1:M] and LP_NEG[1:M]. The frame image detection block 450 includes a block image detector 452, a second adder 454, and a frame image detector 456.

The block image detector 452 detects an image pattern of each of the plurality of unit blocks based on the line polarity detection results LP_POS[1:M] and LP_NEG[1:M]. The image pattern of each unit block may correspond to a first data inversion method, e.g., the 1-dot inversion method or a second data inversion method, e.g., the 2-dot inversion method. The first data inversion method may be a data inversion method of the display device and the second data inversion method may be a data inversion method that does not allow a flicker to occur in the first data inversion method.

The second adder 454 separately counts first block image patterns BIP1 coinciding with the first data inversion method and second block image patterns BIP2 coinciding with the second data inversion method among image patterns of the respective unit blocks and outputs a third sum SUM3 and a fourth sum SUM4.

The frame image detector 456 compares the third sum SUM3 with the fourth sum SUM4 and determines the frame image pattern FIP. For instance, when a number of the first block image patterns BIP1 is greater than a number of the second block image patterns BIP2, the frame image detector 456 may determine the frame image pattern FIP as the image pattern of the first data inversion method. Contrarily, when the number of the first block image patterns BIP1 is less than the number of the second block image patterns BIP2, the frame image detector 456 may determine the frame image pattern FIP as the image pattern of the second data inversion method.

The inversion method controller 460 generates the polarity control signal POL to controlling the data inversion method based on the frame image pattern FIP. For instance, when the frame image pattern FIP is the image pattern of the first data inversion method, the inversion method controller 460 may change the data inversion method of the display device into the second data inversion method because a flicker becomes worse as the number of block image patterns (here, BIP1) coinciding the data inversion method of the display device increases. Alternatively, when the frame image pattern FIP is the image pattern of the second data inversion method, the inversion method controller 460 may maintain the first data inversion method as the data inversion method of the display device.

Figure 10:
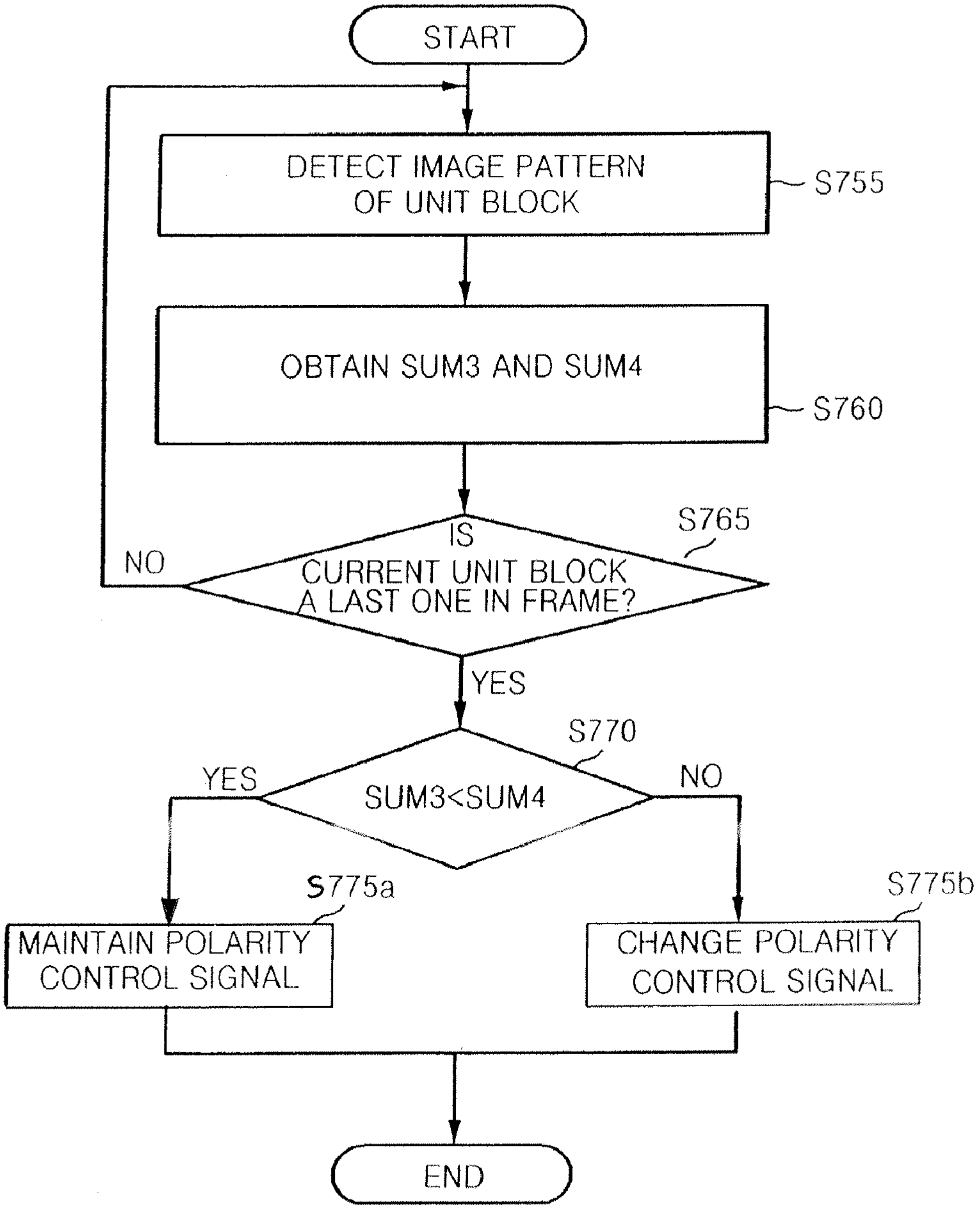
FIG. 10 is a flowchart illustrating an operation of the frame pattern detector, according to an embodiment of the present general inventive concept.

FIG. 10 is a flowchart illustrating an operation of the frame pattern detector 440, according to an embodiment of the present general inventive concept. Hereinafter, the operation of the frame pattern detector 440 with respect to the image pattern of an odd frame will be described with reference to FIGS. 4, 9, and 10 since a result of the operation of the frame pattern detector 440 with respect to the image pattern of an even frame is opposite to that with respect to the image pattern of an odd frame.

In operation S755, the block image detector 452 of the frame pattern detector 440 detects the image pattern of a current unit block as the image pattern BIP1 of the 1-dot inversion method when the first line polarity register LP_POS stores the binary digits "1111 1111", that is, the second line polarity register LP_NEG stores the binary digits "0000 0000". In addition, the block image detector 452 detects the image pattern of a current unit block as the image pattern BIP2 of the 2-dot inversion method when the first line polarity register LP_POS stores the binary digits "1001 1001", that is, the second line polarity register LP_NEG stores the binary digits "0110 0110".

In operation S760, the second adder 454 of the frame pattern detector 440 separately counts the image patterns BIP1 of the 1-dot inversion method and the image pattern BIP2 of the 2-dot inversion method to obtain the third sum SUM3 and the fourth sum SUM4.

In operation S765, the frame pattern detector 440 determines whether the current unit block is the last one in a current frame. When it is determined that the current unit block is not the last one, the frame pattern detector 440 performs pattern detection with respect to a next unit block. When it is determined that the current unit block is the last one, the frame image detector 456 of the frame pattern detector 440 compares the third sum SUM3 with the fourth sum SUM4 in operation S770.

When it is determined that the third sum SUM3 is less than the fourth sum SUM4 in operation S770, the inversion method controller 460 does not change the current polarity control signal POL in order to maintain the current 1-dot inversion method in operation S775*a*. However, when it is determined that the third sum SUM3 is not less than the fourth sum SUM4 in operation S770, the inversion method controller 460 changes the current polarity control signal POL in order to change the current 1-dot inversion method into the 2-dot inversion method, in which a flicker does not occur, in operation S775*b*.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, according to various embodiments of the present general inventive concept, a timing controller changes the data inversion method of a display device based on a displayed image pattern, thereby reducing a flicker.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A timing controller, comprising:

a line pattern detector configured to divide received data into a plurality of unit blocks and to detect a line polarity of each of a plurality of horizontal lines included in each of the unit blocks; and a frame pattern detector to generate a polarity control signal to control a data inversion method based on a frame image pattern detected based on line polarities of the respective horizontal lines, the frame pattern detector comprising:

a frame image detection block to determine the frame image pattern based on a result of line polarity detection; and an inversion method controller to generate the polarity control signal to control the data inversion method based on the frame image pattern, wherein the frame image detection block comprises:

a block image detector to detect an image pattern of each of the unit blocks based on the result of the line polarity detection;

a second adder configured to count image patterns coinciding with a first data inversion method among image patterns of the respective unit blocks so as to obtain a third sum and to count image patterns coinciding with a second data inversion method among the image patterns of the respective unit blocks so as to obtain a fourth sum; and a frame image detector to compare the third sum with the fourth sum and to determine the frame image pattern.

2. The timing controller of claim 1, wherein the line pattern detector comprises:

a first adder to add grayscale values of odd subpixels on each of the horizontal lines so as to obtain a first sum and to add grayscale values of even subpixels on each of the horizontal lines so as to obtain a second sum; and a line polarity detection block to detect the line polarity of each of the plurality of horizontal lines based on the first sum and the second sum.

3. The timing controller of claim 2, wherein the line polarity detection block comprises:

a subtractor to obtain a difference between the first sum and the second sum; and a line polarity detector to detect the line polarity of each of the plurality of horizontal lines based on the difference between the first sum and the second sum.

4. The timing controller of claim 3, wherein the line polarity detector detects the polarity of each of the horizontal lines only when the difference between the first sum and the second sum is greater than a predetermined threshold value.

5. The timing controller of claim 3, wherein the line polarity detector changes a method of detecting the line polarity based on a data inversion method of a display device.

6. The timing controller of claim 2, wherein the line pattern detector further comprises:

a line polarity register to store a result of detecting the line polarity.

7. The timing controller of claim 1, wherein the first data inversion method is a data inversion method of a display device and the second data inversion method is a data inversion method which does not allow a flicker to occur in the first data inversion method.

8. A display device, comprising:

a panel including a plurality of source lines;

a source driver to output data to drive the plurality of source lines; and a timing controller to generate a polarity control signal to control a data inversion method with respect to the data, the timing controller comprising:

a line pattern detector configured to detect a line polarity of each of a plurality of horizontal lines received by the timing controller; and a frame pattern detector to generate a polarity control signal to control a data inversion method based on a result of the line polarity detection, the frame pattern detector comprising:

a block image detector to detect an image pattern of a plurality of unit blocks based on the result of the line polarity detection;

an adder configured to count image patterns to coincide with a first data inversion method among image patterns of the respective unit blocks to obtain a first sum and to count image patterns coinciding with a second data inversion method among the image patterns of the respective unit blocks to obtain a second sum; and a frame image detector to compare the first sum with the second sum and to determine the frame image pattern.

9. A method of operating a display device, the method comprising:

detecting a line polarity of each of a plurality of horizontal lines included in each of a plurality of unit blocks into which received data is divided; and generating a polarity control signal to control a data inversion method based on a frame image pattern detected based on line polarities of the respective horizontal lines, the generating the polarity control signal comprising:

determining the frame image pattern based on a result of detecting the line polarity; and generating the polarity control signal to control the data inversion method based on the frame image pattern, wherein the determining the frame image pattern comprises:

detecting an image pattern of each of the unit blocks based on the result of detecting the line polarity;

obtaining a third sum and a fourth sum by counting image patterns coinciding with a first data inversion method among image patterns of the respective unit blocks and counting image patterns coinciding with a second data inversion method among the image patterns of the respective unit blocks; and comparing the third sum with the fourth sum and determining the frame image pattern.

10. The method of claim 9, wherein the detecting the line polarity of each of the plurality of horizontal lines comprises:

obtaining a first sum and a second sum by adding grayscale values of odd subpixels on each of the horizontal lines and adding grayscale values of even subpixels on each of the plurality of horizontal lines; and detecting the line polarity of each of the plurality of horizontal lines based on the first sum and the second sum.

11. The method of claim 10, wherein the detecting the line polarity of each of the horizontal lines based on the first sum and the second sum comprises:

obtaining a difference between the first sum and the second sum; and detecting the line polarity of each of the plurality of horizontal lines based on the difference between the first sum and the second sum.

12. The method of claim 11, wherein the detecting the line polarity of each of the plurality of horizontal lines based on the difference is performed only when the difference between the first sum and the second sum is greater than a predetermined threshold value.

13. The method of claim 11, wherein the detecting the line polarity of each of the plurality of horizontal lines based on the difference comprises:

changing a method of detecting the line polarity based on a data inversion method of a display device.

14. The method of claim 10, wherein the detecting the line polarity of each of the horizontal lines further comprises:

storing a result of detecting the line polarity.

15. The method of claim 9, wherein the first data inversion method is a data inversion method of a display device and the second data inversion method is a data inversion method which does not allow a flicker to occur in the first data inversion method.

16. A timing controller, comprising:

a frame pattern detector to detect an image pattern of data, the frame pattern detector comprising:

an adder configured to count image patterns to coincide with a first data inversion method among image patterns of respective unit blocks of received data to obtain a first sum and to count image patterns coinciding with a second data inversion method among the image patterns of the respective unit blocks to obtain a second sum; and a frame image detector to compare the first sum with the second sum and to determine a frame image pattern; and a controller to change a data inversion process based on the detected image pattern.

17. The timing controller of claim 16, further comprising:

a line pattern detector to detect the image pattern of the data by dividing received data into a plurality of unit blocks and to detect a line polarity of each of a plurality of horizontal lines included in each of the unit blocks.

18. The timing controller of claim 16, wherein the controller changes the data inversion process based on the detected image pattern by generating a polarity control signal to control the data inversion process based on the detected image pattern corresponding to line polarities of the respective horizontal lines.

19. A display apparatus, comprising:

a panel including a plurality of source lines;

a source driver to output data to drive the plurality of source lines; and a timing controller comprising:

a detector to detect an image pattern of data, the detector comprising:

an adder configured to count image patterns to coincide with a first data inversion method among image patterns of respective unit blocks of received data to obtain a first sum and to count image patterns coinciding with a second data inversion method among the image patterns of the respective unit blocks to obtain a second sum; and a frame image detector to compare the first sum with the second sum and to determine a frame image pattern; and a controller to change a data inversion process based on the detected image pattern.

20. A method to reduce flickering in a display unit, the method comprising:

detecting an image pattern of data corresponding to a display unit comprising:

an adder configured to count image patterns to coincide with a first data inversion method among image patterns of respective unit blocks of received data to obtain a first sum and to count image patterns coinciding with a second data inversion method among the image patterns of the respective unit blocks to obtain a second sum; and a frame image detector to compare the first sum with the second sum and to determine a frame image pattern; and changing a data inversion process based on the detected image pattern.

21. A non-transitory computer-readable recording medium having embodied thereon a computer program to execute a method, wherein the method comprises:

detecting an image pattern of data corresponding to a display unit comprising:

counting image patterns to coincide with a first data inversion method among image patterns of respective unit blocks of received data to obtain a first sum and counting image patterns coinciding with a second data inversion method among the image patterns of the respective unit blocks to obtain a second sum; and comparing the first sum with the second sum and to determine a frame image pattern; and changing a data inversion process based on the detected image pattern.

* * * * *